(12) United States Patent
Deng et al.

(10) Patent No.: US 11,289,109 B2
(45) Date of Patent: Mar. 29, 2022

(54) SYSTEMS AND METHODS FOR AUDIO SIGNAL PROCESSING USING SPECTRAL-SPATIAL MASK ESTIMATION

(71) Applicant: BEIJING DIDI INFINITY TECHNOLOGY AND DEVELOPMENT CO., LTD., Beijing (CN)

(72) Inventors: Chengyun Deng, Beijing (CN); Hui Song, Beijing (CN); Yi Zhang, Beijing (CN); Yongtao Sha, Beijing (CN)

(73) Assignee: BEIJING DIDI INFINITY TECHNOLOGY AND DEVELOPMENT CO., LTD., Beijing (CN)

( * ) Notice: Subject to any disclaimer, the term of this patent is extended or adjusted under 35 U.S.C. 154(b) by 209 days.

(21) Appl. No.: 16/858,185

(22) Filed: Apr. 24, 2020

(65) Prior Publication Data

US 2020/0342891 A1    Oct. 29, 2020

(51) Int. Cl.
*G10L 21/0264* (2013.01)
*G10L 15/16* (2006.01)
*G10L 25/18* (2013.01)

(52) U.S. Cl.
CPC .......... *G10L 21/0264* (2013.01); *G10L 15/16* (2013.01); *G10L 25/18* (2013.01)

(58) Field of Classification Search
CPC ..... G10L 21/0264; G10L 15/16; G10L 25/18; G10L 25/30
USPC .......................................................... 704/9
See application file for complete search history.

(56) References Cited

U.S. PATENT DOCUMENTS

| 2007/0260455 | A1* | 11/2007 | Akamine | G10L 15/20 704/233 |
| 2007/0296969 | A1* | 12/2007 | Goldstein | G01J 3/0229 356/328 |
| 2013/0022261 | A1* | 1/2013 | Imai | G06K 9/3241 382/154 |
| 2018/0262832 | A1* | 9/2018 | Grosche | H04R 1/406 |
| 2018/0299527 | A1* | 10/2018 | Helwani | G10L 25/18 |
| 2020/0342891 | A1* | 10/2020 | Deng | G10L 21/0208 |

* cited by examiner

*Primary Examiner* — Akwasi M Sarpong
(74) *Attorney, Agent, or Firm* — Bayes PLLC (57) ABSTRACT

Embodiments of the disclosure provide systems and methods for audio signal processing. An exemplary system may include a communication interface configured to receiving a first audio signal acquired from an audio source through a first channel, and a second audio signal acquired from the same audio source through a second channel. The system may also include at least one processor coupled to the communication interface. The at least one processor may be configured to determine channel features based on the first audio signal and the second audio signal individually and determine a cross-channel feature based on the first audio signal and the second audio signal collectively. The at least one processor may further be configured to concatenate the channel features and the cross-channel feature and estimate spectral-spatial masks for the first channel and the second channel using the concatenated channel features and the cross-channel feature. The at least one processor may also be configured to perform beamforming based on the spectral-spatial masks for the first channel and the second channel.

20 Claims, 4 Drawing Sheets

SYSTEMS AND METHODS FOR AUDIO SIGNAL PROCESSING USING SPECTRAL-SPATIAL MASK ESTIMATION

CROSS-REFERENCE TO RELATED APPLICATIONS

This application claims the benefit of priority to Chinese Patent Application No. 201910344954.7, filed on Apr. 26, 2019, which is incorporated herein by reference in its entirety.

TECHNICAL FIELD

The present disclosure relates to systems and methods for audio signal processing, and more particularly to, systems and methods for robust automatic speech recognition (ASR) of noisy audio signal using a spectral-spatial mask estimation method without mask pooling before beamforming.

BACKGROUND

New waves of consumer-centric applications, such as voice search and voice interaction with mobile devices and home entertainment systems, increasingly require ASR to be robust to the full range of real-world noise and other acoustic distorting conditions (e.g., in low signal-to-noise ratio (SNR) and high reverberation scenes).

Multi-channel speech enhancement methods are used for improving the robustness of ASR. The rise of deep neural networks (DNNs) has made a big boost on ASR performance. Time-frequency (T-F) mask estimation using DNNs, followed by traditional beamforming methods, has become state-of-the-art technique in multi-channel speech enhancement tasks. In general, mask-based beamforming methods can be divided into spectral methods and spectral-spatial methods according to input features used to estimate the mask.

Spectral methods typically train a deep neural network (DNN) to estimate speech on each individual channel but they fail to take into account cross-channel spatial information. On the other hand, conventional spectral-spatial methods utilize spatial information of microphone array to improve the performance of mask-based beamforming in diverse forms. However, conventional spectral-spatial methods are not extendable to other multi-channel scenarios and the mask pooling still plays a significant role in case of channel outliers. Because, pooling operations on multiple masks, such as median operator, does not guarantee the multi-channel mask estimation accuracy, a more robust method is needed.

Embodiments of the disclosure address the above problems by providing audio processing systems and methods for robust automatic speech recognition (ASR) of noisy audio signal using a spectral-spatial mask estimation method without mask pooling before beamforming.

SUMMARY

Embodiments of the disclosure provide a system for audio signal processing. An exemplary system may include a communication interface configured to receiving a first audio signal acquired from an audio source through a first channel, and a second audio signal acquired from the same audio source through a second channel. The system may also include at least one processor coupled to the communication interface. The at least one processor may be configured to determine channel features based on the first audio signal and the second audio signal individually and determine a cross-channel feature based on the first audio signal and the second audio signal collectively. The at least one processor may further be configured to concatenate the channel features and the cross-channel feature and estimate spectral-spatial masks for the first channel and the second channel using the concatenated channel features and the cross-channel feature. The at least one processor may also be configured to perform beamforming based on the spectral-spatial masks for the first channel and the second channel.

Embodiments of the disclosure also provide a method for audio signal processing. An exemplary method may include receiving a first audio signal acquired from an audio source through a first channel, and a second audio signal acquired from the same audio source through a second channel and determining channel features based on the first audio signal and the second audio signal individually. The method may also include determining a cross-channel feature based on the first audio signal and the second audio signal collectively and concatenating the channel features and the cross-channel feature. The method may further include estimating spectral-spatial masks for the first channel and the second channel using the concatenated channel features and the cross-channel feature, and performing beamforming based on the spectral-spatial masks for the first channel and the second channel.

Embodiments of the disclosure further provide a non-transitory computer-readable medium storing instructions that, when executed by one or more processors, cause the one or more processors to perform a method for audio signal processing. The method may include receiving a first audio signal acquired from an audio source through a first channel, and a second audio signal acquired from the same audio source through a second channel and determining channel features based on the first audio signal and the second audio signal individually. The method may also include determining a cross-channel feature based on the first audio signal and the second audio signal collectively and concatenating the channel features and the cross-channel feature. The method may further include estimating spectral-spatial masks for the first channel and the second channel using the concatenated channel features, and the cross-channel feature, and performing beamforming based on the spectral-spatial masks for the first channel and the second channel.

It is to be understood that both the foregoing general description and the following detailed description are exemplary and explanatory only and are not restrictive of the invention, as claimed.

DETAILED DESCRIPTION

Reference will now be made in detail to the exemplary embodiments, examples of which are illustrated in the accompanying drawings. Wherever possible, the same reference numbers will be used throughout the drawings to refer to the same or like parts.

Figure 1:
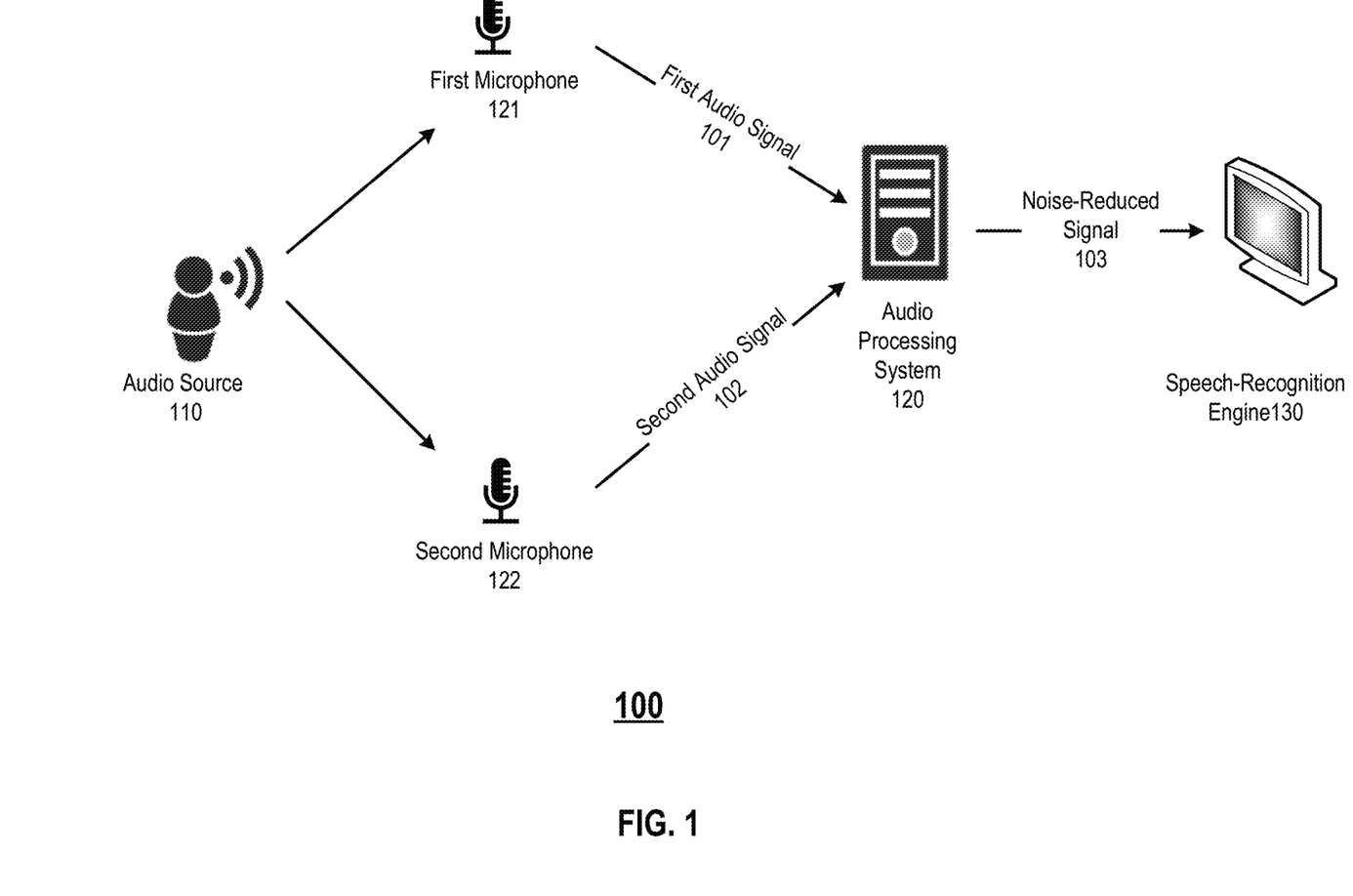
FIG. 1 illustrates a schematic diagram of an exemplary automatic speech recognition (ASR) system, according to embodiments of the disclosure.

FIG. 1 illustrates a schematic diagram of an exemplary automatic speech recognition (ASR) system (referred to as "ASR system 100"), according to embodiments of the disclosure. In some embodiments, ASR system 100 may include components shown in FIG. 1, including an audio source 110, an audio processing system 120, a first microphone 121 and a second microphone 122.

Consistent with the present disclosure, ARS system 100 is configured to provide automatic speech recognition for separating target speech from a noisy environment (e.g., recognizing human speech in noise). For example, audio source 110 may generate a speech (e.g., voice commands for playing initiate phone calls, selecting radio stations or palying music from a user device). Audio processing system 120 may receive the speech along with a noise (e.g., the environmental noise) through a plurality of audio collection channels (e.g., first microphone 121 and second microphone 122), and recognize/separate the speech from the noise based on the channel features of the audio signals obtained by each audio collection channel and the cross-channel features determined based on different audio signals obtained by different audio collection channels. In some embodiments, audio processing system 120 may concatenate the channel features and the cross-channel features, and input them to a neural network learning model (e.g., a Bidirectional Long Short-Term Memory (BLSTM) with multiple channels) simultaneously to conduct a neural network-based mask estimation. Because the neural network model integrates magnitude spectrum and spatial information of the audio signals by taking into account both the channel features and the cross-channel features of the audio signals without mask pooling, the ASR system and method proposed herein shows a better ASR performance than conventional mask-based beamforming methods in situations where the SNR for the speech is low.

In some embodiments, audio source 110 may be a user of ASR system 100, where speeches are given for sending commends for controlling user device(s) such as a handheld device (e.g. smart phone, tablet, etc.), a wearable device (e.g., eyeglasses, wrist watch, etc.), a radio, a music player, an electronic musical instrument, an automobile control station, a gaming console, a television set, a laptop computer, a desktop computer, a netbook computer, a media center, a set-top box, a global positioning system (GPS), or any other suitable device. For example, the speech may include voice commands for initiating phone calls, selecting ratio stations or playing music from a smartphone, MP3 player or music-loaded flash drive. In some embodiments, the user (e.g., audio source 110) may provide a manual control input (e.g., by means of a physical touch of a button) to ASR system 100 to enable the system such as providing a "listening window" during which ASR system 100 may accept the speech from the user for speech recognition.

It is contemplated that the speech provided by audio source 110 is not limited to controlling user device(s). ASR system 100 may also be applied to other suitable applications such as user identification, data entry, speech-to-text processing etc. It is also contemplated that audio source 110 could be other than a human. For example, audio source 110 may be a speaker that plays a speech, an audio book, a news broadcast, a song, etc. The speaker can be a standalone speaker, or part of another device, e.g., a smart phone, a vehicle, a wearable device, a computer, a TV, a radio, etc.

In some embodiments, ARS system 100 may also include a plurality of audio collection channels, each including a transducer (e.g., first microphone 121 or second microphone 122) that can capture audio by converting sound waves (e.g., the speech generated by audio source 110) into an electrical signal. For example, first microphone 121 and second microphone 122 may be disposed around audio source 110 at different locations to obtain a first audio signal 101 including the speech and a first environmental noise (i.e., a first speech-in-noise mixture) and a second audio signal 102 including the speech and a second environmental noise (i.e., a second speech-in-noise mixture) respectively. Although obtaining the audio signal based on the same sound from the same audio source (e.g., the speech generated by audio source 110), first audio signal 101 and second audio signal 102 may be slightly different because of the characteristics and location of first microphone 121 and second microphone 122.

In some embodiments, first microphone 121 and second microphone 122 may be connected to audio processing system 120 through different channels such as a wireless communication link (e.g., a Bluetooth wireless communication link or a Wi-Fi connection) or a physical bus (e.g., a Universal Serial Bus (USB) bus) for transmitting the received audio signal (e.g., first audio signal 101 received by first microphone 121 and second audio signal 102 received by second microphone 122). In some embodiments, when being transmitted, first audio signal 101 and second audio signal 102 may be in digital form for better preserving the quality of the signals.

It is contemplated that the number and location of different audio collection channels are for illustrative purpose only and are not limited as shown in FIG. 1. To improve the ASR performance, ASR system 100 may include 3, 4, 5, 6 or more different audio collection channels located at sparse locations around audio source 110. Accordingly, more audio signals (e.g., a third, a fourth, a fifth, etc.) may be obtained and be transmitted to audio processing system 120 for processing.

In some embodiments, audio processing system 120 can include any appropriate type of general-purpose or special-purpose microprocessor, digital signal processor, or microcontroller for processing first audio signal 101 and second audio signal 102 received from first microphone 121 and second microphone 122 respectively and collectively. Audio processing system 120 may generate a noise-reduced audio signal 103 corresponding to the speech based on considering the channel features of each of the plurality of audio collection channels and cross-channel features among the plurality of audio collection channels. In some embodiments, audio processing system 120 may apply a neural network learning model estimating spectral-spatial masks for the first channel (e.g., the audio collection channel including first microphone 121) and the second channel (e.g., the audio collection channel including second microphone 122) jointly using the concatenated channel features and the cross-channel feature before beamforming for the ASR. Because the ASR is performed based on integrating spectral and spatial information of the audio signals obtained by both the first and the second channels (e.g., considering cross-channel spectral and spatial information) without mask pooling, the system disclosed herein has a better ASR performance (e.g., lower Word Error Rate (WER)) comparing to traditional ASR systems.

In some embodiments, ASR system 100 may further include a speech-recognition engine 130 for further processing the noise-reduced signal to recognize the speech recorded therein. For example, speech-recognition engine 130 may detect the command for controlling the user device(s) based on the noise-reduced audio signal.

In some embodiments, ASR system 100 may optionally include a network to facilitate the communication among the various components of ARS system 100, such as first microphone 121, second microphone 122, audio processing system 120 and speech-recognition engine 130. For example, the network may be a local area network (LAN), a wireless network, a cloud computing environment (e.g., software as a service, platform as a service, infrastructure as a service), a client-server, a wide area network (WAN), etc. In some embodiments, network may be replaced by wired data communication systems or devices.

In some embodiments, the various components of ASR system 100 may be remote from each other or in different locations and be connected through the network. In some alternative embodiments, certain components of ASR system 100 may be located on the same site or inside one device. For example, speech-recognition engine 130 may be located on-site with or be part of audio processing system 120 such as being an application or a computer program that when executed would perform further processing of noise-reduced signal 103 (e.g., detect the command for controlling the user device(s) based on the noise-reduced audio signal).

Figure 2:
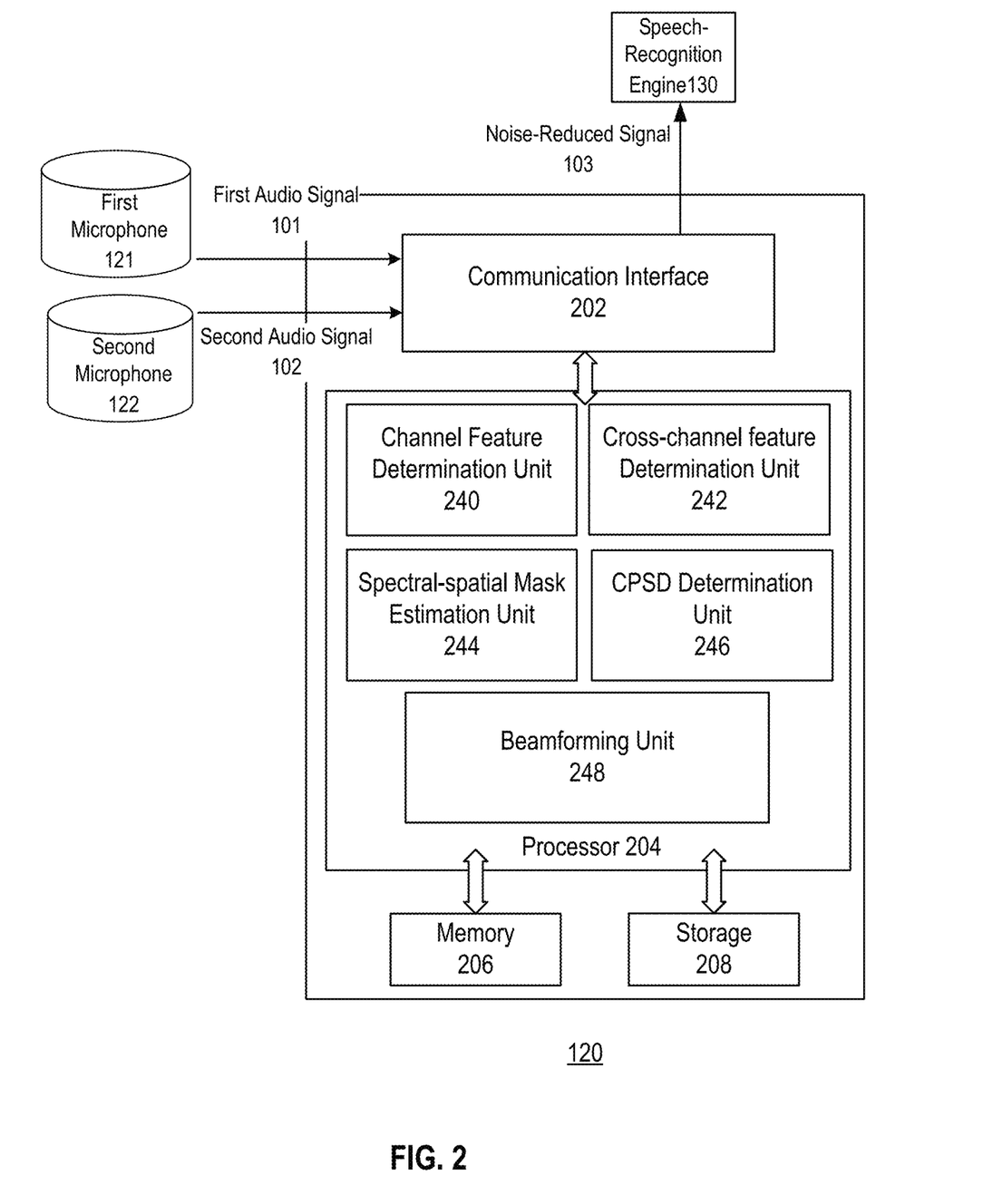
FIG. 2 illustrates a block diagram of an exemplary audio processing system, according to embodiments of the disclosure.

FIG. 2 illustrates a block diagram of an exemplary audio processing system 120, according to embodiments of the disclosure. In some embodiments, as shown in FIG. 2, audio processing system 120 may include a communication interface 202, a processor 204, a memory 206, and a storage 208. In some embodiments, audio processing system 120 may have different modules in a single device, such as an integrated circuit (IC) chip (e.g., implemented as an application-specific integrated circuit (ASIC) or a field-programmable gate array (FPGA)), or separate devices with dedicated functions. In some embodiments, one or more components of audio processing system 120 may be located in a cloud or may be alternatively in a single location (such as inside a mobile device) or distributed locations. Components of audio processing system 120 may be in an integrated device or distributed at different locations but communicate with each other through a network (not shown). Consistent with the president disclosure, audio processing system 120 may be configured to generate noise-reduced signal 103 for speech-recognition engine 130 to further process.

Communication interface 202 may receive data from components such as first microphone 101 and second microphone 102 and send data to speech-recognition engine 130 via communication cables, a Wireless Local Area Network (WLAN), a Wide Area Network (WAN), wireless networks such as radio waves, a cellular network, and/or a local or short-range wireless network (e.g., Bluetooth™), or other communication methods. In some embodiments, communication interface 202 may include an integrated service digital network (ISDN) card, cable modem, satellite modem, or a modem to provide a data communication connection. As another example, communication interface 202 may include a local area network (LAN) card to provide a data communication connection to a compatible LAN. Wireless links can also be implemented by communication interface 202. In such an implementation, communication interface 202 can send and receive electrical, electromagnetic or optical signals that carry digital data streams representing various types of information.

Consistent with some embodiments, communication interface 202 may receive first audio signal 101 and second audio signal 102 from first microphone 101 and second microphone 102. Communication interface 202 may further provide the received data and information to memory 206 and/or storage 208 for storage or to processor 204 for processing.

Processor 204 may include any appropriate type of general-purpose or special-purpose microprocessor, digital signal processor, or microcontroller. Processor 204 may be configured as a separate processor module dedicated to performing audio signal processing based on audio signals 101 and 102 using a neural network learning model (e.g., the BLSTM) and a beamforming algorithm. Alternatively, processor 204 may be configured as a shared processor module (e.g., a processor of speech-recognition engine 130) for performing other functions in addition to audio signal processing.

Memory 206 and storage 208 may include any appropriate type of mass storage provided to store any type of information that processor 204 may need to operate. Memory 206 and storage 208 may be a volatile or non-volatile, magnetic, semiconductor, tape, optical, removable, non-removable, or other type of storage device or tangible (i.e., non-transitory) computer-readable medium including, but not limited to, a ROM, a flash memory, a dynamic RAM, and a static RAM. Memory 206 and/or storage 208 may be configured to store one or more computer programs that may be executed by processor 204 to perform functions disclosed herein. For example, memory 206 and/or storage 208 may be configured to store program(s) that may be executed by processor 204 to separate speech from speech-in-noise mixtures and generate noise-reduced signal 103.

In some embodiments, memory 206 and/or storage 208 may also store intermediate data such as channel features, cross-channel features (e.g., inter-channel level difference and inter-channel phase difference), spectral-spatial masks for different audio collection channels, etc. Memory 206 and/or storage 208 may additionally store neural network learning models (e.g., the BLSTM) and algorithms (e.g., beamforming algorithms) including their parameters.

As shown in FIG. 2, processor 204 may include multiple modules, such as a channel feature determination unit 240, cross-channel feature determination unit 242, a spectral-spatial mask estimation unit 244, a CPSD determination unit 246, and a beamforming unit 248, and the like. These units (and any corresponding sub-modules or sub-units) can be hardware units (e.g., portions of an integrated circuit) of processor 204 designed for use with other components or software units implemented by processor 204 through executing at least part of a program. The program may be stored on a computer-readable medium, and when executed by processor 204, it may perform one or more functions. Although FIG. 2 shows units 240-248 all within one processor 204, it is contemplated that these units may be distributed among different processors located closely or remotely with each other.

Figure 3:
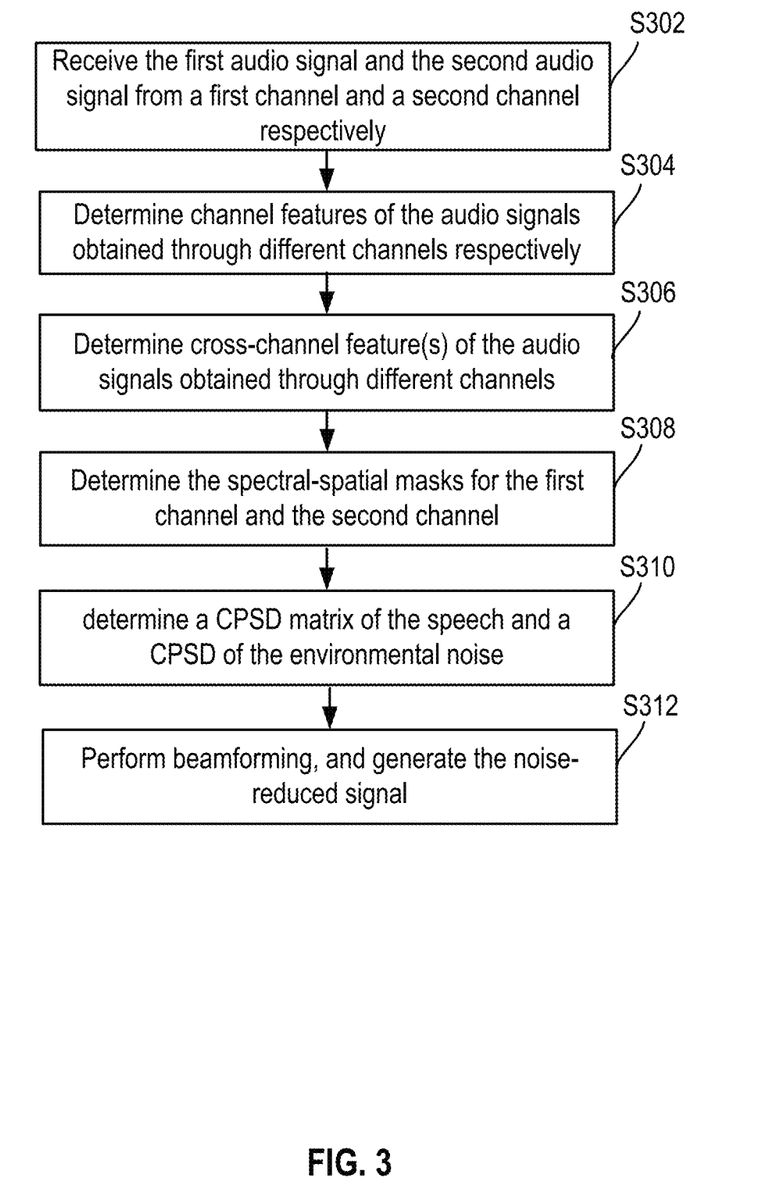
FIG. 3 illustrates a flowchart of an exemplary method audio processing, according to embodiments of the disclosure.
Figure 4:
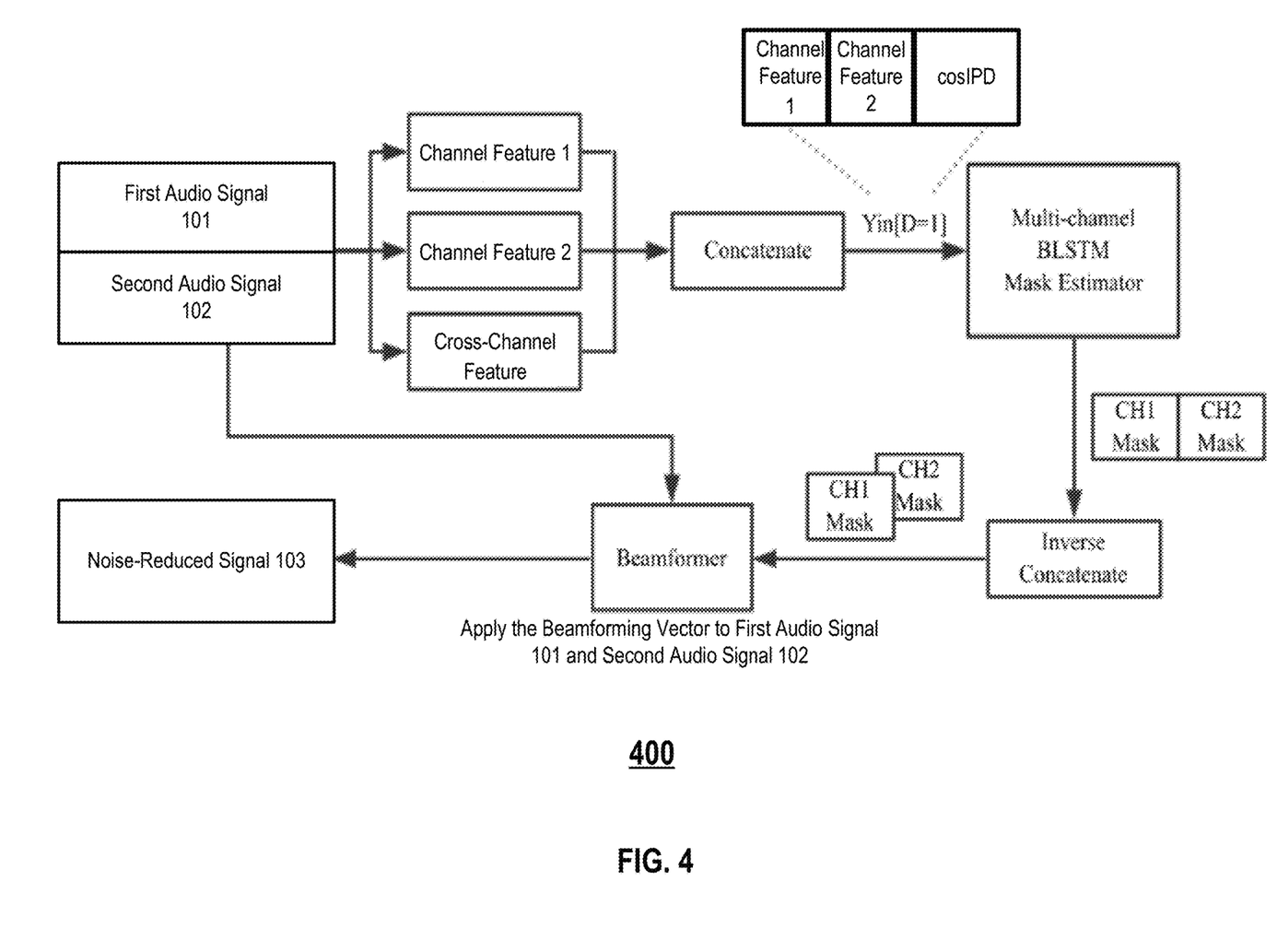
FIG. 4 illustrates a workflow of an exemplary spectral-spatial mask based beamforming, according to embodiments of the disclosure.

In some embodiments, units 242-248 of FIG. 2 may execute computer instructions to perform audio processing, e.g., method 300 illustrated by FIG. 3. The processing may be implemented according to a workflow 400 (illustrated in FIG. 4). Method 300 may be implemented by audio processing system 120 and particularly processor 204 or a separate processor not shown in FIG. 2. Method 300 may include steps S302-S312 as described below. It is to be appreciated that some of the steps may be optional, and some of the steps may be performed simultaneously, or in a different order than shown in FIG. 3. FIGS. 2-4 would be disclosed together.

In step S302, communication interface 202 may receive first audio signal 101 and second audio signal 102 from a first channel including first microphone 121 and a second channel including second microphone 122 respectively. In some embodiments, first audio signal 101 may include a speech signal (e.g., the audio signal corresponding to the speech generated by audio source 110) and a first noise signal corresponding to an environmental noise. Second audio signal 102 may include the speech signal and a second noise signal corresponding to the environmental noise. Due to the different channel characteristics, the speech signal and noise signal captured through each channel may be different.

In step S304, channel feature determination unit 240 may determine channel features of the audio signals obtained by different channels (e.g., first audio signal 101 and second audio signal 102) respectively. In some embodiments, the channel feature may include the magnitude spectra of first audio signal 101 and second audio signal 102, respectively. For example, channel feature determination unit 240 may determine a time-frequency representation of first audio signal 101 and second audio signal 102 based on performing a Short Time Fourier Transform (STFT) to first audio signal 101 and second audio signal 102 respectively. The magnitude spectrum of first audio signal 101 and second audio signal 102 may be determined based on the time-frequency representations.

In step S306, cross-channel feature determination unit 242 may determine cross-channel feature(s) of the audio signals obtained by different channels (e.g., the first channel and second channel). In some embodiments, the cross-channel feature(s) may be an inter-channel phase difference (IPD) and/or an inter-channel level difference (ILD) between first audio signal 101 and second audio signal 102. For example, IPD and ILD at each time-frequency bin (e.g., the discretized steps at the STFT) of first audio signal 101 and second audio signal 102 can be defined according to equations (1) and (2) respectively:

$$IPD(t, f) = \varphi_1(t, f) - \varphi_2(t, f) \quad (1)$$

$$ILD(t, f) = 20 \times \log\left\|\frac{S_1(t, f)}{S_2(t, f)}\right\| \quad (2)$$

where subscripts 1 and 2 denote the first and the second channels, $\varphi$ is the phase spectrum and S is the magnitude spectrum. In some embodiments, a trigonometric function may be calculated on the cross-channel features for smoothing the phase spectrum. For example, a cosIPD and a sinIPD may be determined according to equations (3) and (4) respectively.

$$\cos IPD_{12}(t,f) = \cos(\varphi_1(t,f) - \varphi_2(t,f)) \quad (3)$$

$$\sin IPD_{12}(t,f) = \sin(\varphi_1(t,f) - \varphi_2(t,f)) \quad (4)$$

In step S308, spectral-spatial mask estimation unit 244 may determine the spectral-spatial masks for the first channel and the second channel. In some embodiments, the spectral-spatial masks for the first channel include a first speech mask and a first noise mask for first audio signal 101. The spectral-spatial masks for the second channel include a second speech mask and a second noise mask for second audio signal 102. In some embodiments, the first speech mask, the first noise mask, the second speech mask, and the second noise mask are jointly estimated (e.g., being estimated at the same time based on a same set of variables). For example, spectral-spatial mask estimation unit 244 may concatenate the channel features and the cross-channel feature of the first and the second channels. For example, referring to FIG. 4, channel feature 1 may be the magnitude spectrum of first audio signal 101, channel feature 2 may be the magnitude spectrum of second audio signal 102, and cross-channel feature may be the cosIPD between the first channel and the second channel. The channel feature 1, channel feature 2, and cross-channel feature may be concatenated before inputting into a neural network learning model (e.g., a multi-channel BLSTM mask estimator as shown in FIG. 4).

It is contemplated that, other suitable cross-channel features such as sinIPD, cosILD, sinILD, sinIPDcosIPD, etc., can also be used as part of the input to the neural network learning model.

In some embodiments, the neural network learning model (e.g., a multi-channel BLSTM mask estimator as shown in FIG. 4) may include multiple layers, each configured with a set of model parameters. For example, model parameters of a specific configuration of the two-channel mask estimation network is shown in Table 1 below:

TABLE 1

| Layer | Units | Type | Non-linearity | $P_{dropout}$ |
|---|---|---|---|---|
| Input | 1539 | | | |
| L1 | 512 | BLSTM | Tanh | 0.5 |
| L2 | 1026 | FF | ReLu | 0.5 |
| L3 | 1026 | FF | ReLu | 0.5 |
| Output | 2052 | | Sigmoid | 0 | where the input feature includes magnitude spectra of the two channels (e.g., referred to as CH1 and CH2 in FIG. 4) and cosIPD between the two channels (thus 513*3=1539), and the output includes the masks of the first channel (referred as CH1 mask in FIG. 4) including the first speech mask and the first noise mask, and the masks of the second channel (referred as CH2 mask in FIG. 4) including the second speech mask, and the second noise mask (thus 513*4=2052).

Unlike most existing audio processing methods where mask pooling is performed (e.g., using median or maximum operator for mask merging), the method disclosed herein preserves the cross-channel information when jointly estimating the speech and noise masks for the multiple channels at the same time without pooling in any form. Because performing mask pooling in low-SNR or heavy-reverberation circumstances would suffer from significant degradation when the statistics estimation inaccurate, by preserving the cross-channel features in the spectral-spatial masks without performing mask pooling, the method disclosed herein can significantly improve the robustness and accuracy of ASR in low-SNR or heavy-reverberation circumstances.

At step S310, CPSD determination unit 246 may determine a Cross-Power Spectral Density (CPSD) matrix $\Phi_{xx}$ of the speech and a CPSD INN of the environmental noise based on the spectral-spatial masks for the first channel and the second channel (e.g., the CH1 mask and the CH2 mask as shown in FIG. 4). For example, T and INN may be determined according to equations (5) and (6):

$$\Phi_{xx} = \Sigma_{t=1}^{T}(IBM_{Xm}(t,f) * Y_m(t,f))Y^H(t,f) \quad (5)$$

$$\Phi_{NN} = \Sigma_{t=1}^{T}(IBM_{Nm}(t,f) * Y_m(t,f))Y^H(t,f) \quad (6)$$

where m represents the $m^{th}$ channel, $IBM_{Nm}$ and $IBM_{Xm}$ are the ideal binary mask (IBM) of the environmental noise and the speech, *is the element-wise product, and Y is the STFT of the speech-in-noise (e.g., the first audio signal or the second audio signal).

At step S312, beamforming unit 248 may perform beamforming (e.g., to determine the beamforming vector) based on $\Phi_{xx}$ and $\Phi_{NN}$, and generate the noise-reduced signal (e.g., noise-reduced signal 103) based on the determined beamforming vector(s). For example, beamforming unit 248 may perform generalized eigenvalue (GEV) where GEV beamforming weights can be determined according to equation (7):

$$F_{GEV} = \mathrm{argmax} \frac{F^H \Phi_{XX} F}{F^H \Phi_{NN} F} \quad (7)$$

where F is an eigenvector.

For another example, beamforming unit 248 may perform minimum variance distortion-less response (MVDR) beamformer, where the residual noise is minimized with the constraint and the signal remains distortion-free from source direction. The MVDR coefficients $F_{MVDF}$ can be determined according to equation (8):

$$F_{MVDR} = \mathrm{argmin}\ F^H \Phi^{NN} s.t. F^H d = 1 \quad (8)$$

where d is the steering vector at every frequency channel, which can be estimated as the principal component of the CPSD of the speech. As a result, MVDR coefficients can be further derived according to equation (9):

$$F_{MVDR} = \frac{\Phi_{NN}^{-1} d}{d^H \Phi_{NN}^{-1} d} \quad (9)$$

In some embodiments, beamforming unit 248 may generate noise-reduced signal 103 based on applying the beamforming vectors to the corresponding audio signals.

The spectral-spatial mask estimation for robust beamforming disclosed herein integrates cross-channel features (e.g., phase difference features) to achieve more accurate masks preserving channel characteristics, where the mask of each channel is applied to CPSD matrices without any pooling operation. This can achieve more accurate mask with channel characteristics, and thus can achieve a more robust beamforming.

In some embodiments, audio processing system 120 may further determine the noise-reduced signal based on audio signal(s) acquired through additional audio collecting channels, e.g., an additional microphone. For example, a third audio signal corresponding to the speech and the environmental noise (beyond first audio signal 101 and second audio signal 102) may be acquired by a third audio collection channel. For example, communication interface 202 may further receive a third audio signal from a third channel (e.g., the audio collection channel including a third microphone not shown). Channel feature determination unit 240 may further determine the channel feature of the third channel based on the third audio signal, similar to determining the channel feature of the first and the second channels in step S304. Cross-channel feature determination unit 242 may then determine the cross-channel feature based on the first audio signal (e.g., being used as the "reference signal") and the third audio signal, similar to determining the cross-channel feature based on the first audio signal and the second audio signal in step S306. The channel features of the first channel, the second channel and the third channel, and the cross-channel features among the channels (e.g., the cross-channel feature between the first channel and the second channel, and the cross-channel feature between the first channel and the third channel) can then be concatenated.

Spectral-spatial mask estimation unit 244 may then estimate spectral-spatial masks for the first channel, the second channel, and the third channel using the concatenated channel features and the cross-channel features. CPSD determination unit 246 can determine the CPSD matrix $\Phi_{xx}$ of the speech and the CPSD matrix INN of the environmental noise based on the spectral-spatial masks for the first channel, the second channel and the third channel. The beamforming can then be performed similar to step S312 based on the updated $\Phi_{xx}$ and $\Phi_{NN}$.

By taking into account more audio signals received from more channels without pooling, the robustness and the accuracy of the ASR can be further improved. It is contemplated that the disclosed system and method can be adapted to accommodate audio signals from more channels using concepts and principles disclosed herein.

Another aspect of the disclosure is directed to a non-transitory computer-readable medium storing instructions which, when executed, cause one or more processors to perform the methods, as discussed above. The computer-readable medium may include volatile or non-volatile, magnetic, semiconductor, tape, optical, removable, non-removable, or other types of computer-readable medium or computer-readable storage devices. For example, the computer-readable medium may be the storage device or the memory module having the computer instructions stored thereon, as disclosed. In some embodiments, the computer-readable medium may be a disc or a flash drive having the computer instructions stored thereon.

It will be apparent to those skilled in the art that various modifications and variations can be made to the disclosed system and related methods. Other embodiments will be apparent to those skilled in the art from consideration of the specification and practice of the disclosed system and related methods.

It is intended that the specification and examples be considered as exemplary only, with a true scope being indicated by the following claims and their equivalents.

What is claimed is:

1. A system for audio signal processing, comprising:
   a communication interface configured to receiving a first audio signal acquired from an audio source through a first channel, and a second audio signal acquired from the same audio source through a second channel; and
   at least one processor coupled to the communication interface and configured to: determine channel features based on the first audio signal and the second audio signal individually;
   determine a cross-channel feature based on the first audio signal and the second audio signal collectively;
   concatenate the channel features and the cross-channel feature;
   wherein the spectral-spatial masks for the first channel include a first speech mask for the first audio signal, and the spectral-spatial masks for the second channel include a second speech mask for the second audio signal;
   determine time-frequency representations by performing a Short Time Fourier Transform (STFT) to the first audio signal and the second audio signal;
   calculate a speech Cross Power Spectral Density (CPSD) matrix based on the first speech mask, the second speech mask, and the time-frequency representations; and perform beamforming using the speech CPSD matrix.

2. The system of claim 1, wherein to jointly estimate spectral-spatial masks for the first channel and the second channel, the at least one processor is further configured to:
apply a neural network learning model to the concatenated channel features and the cross-channel feature.

3. The system of claim 2, wherein the neural network learning model is a Bidirectional Long Short-Term Memory (BLSTM) with multiple channels.

4. The system of claim 1, wherein to determine the channel features, the at least one processor is further configured to:
determine a first magnitude spectrum of the first audio signal and a second magnitude spectrum of the second audio signal, respectively.

5. The system of claim 4, wherein to determine the cross-channel feature, the at least one processor is further configured to:
determine an inter-channel level difference as a ratio between the first magnitude spectrum and the second magnitude spectrum.

6. The system of claim 1, wherein to determine the cross-channel feature, the at least one processor is further configured to:
determine a first phase spectrum of the first audio signal and a second phase spectrum of the second audio signal, respectively; and
determine an inter-channel phase difference as a difference between the first phase spectrum and the second phase spectrum.

7. The system of claim 6, wherein the at least one processor is further configured to:
perform a trigonometric function on the inter-channel phase difference.

8. The system of claim 1, wherein the spectral-spatial masks for the first channel further include a first noise mask for the first audio signal, and the spectral-spatial masks for the second channel further include a second noise mask for the second audio signal, wherein the first speech mask, the first noise mask, the second speech mask, and the second noise mask are jointly estimated.

9. The system of claim 8, wherein the at least one processor is further configured to:
calculate a noise CPSD matrix based on the first noise mask, the second noise mask, and the time-frequency representations; and
perform the beamforming using the speech CPSD matrix and the noise CPSD matrix.

10. The system of claim 1, wherein the communication interface is further configured to receiving a third audio signal acquired from the same audio source; and
the at least one processor is further configured to:
determine an additional channel feature based on the third audio signal;
determine an additional cross-channel feature based on the first audio signal and the third audio signal collectively;
concatenate the channel features and the cross-channel features;
estimate spectral-spatial masks for the first channel, the second channel, and the third channel using the concatenated channel features and the cross-channel feature; and perform beamforming on the spectral-spatial masks for the first channel, the second channel, and the third channel.

11. The system of claim 10, wherein the additional cross-channel feature is indicative of a phase difference between phase spectra of the first audio signal and the third audio signal.

12. A method audio signal processing, comprising: receiving a first audio signal acquired from an audio source through a first channel, and a second audio signal acquired from the same audio source through a second channel;
determining channel features based on the first audio signal and the second audio signal individually;
determining a cross-channel feature based on the first audio signal and the second audio signal collectively;
concatenating the channel features and the cross-channel feature;
estimating spectral-spatial masks for the first channel and the second channel using the concatenated channel features and the cross-channel feature;
wherein the spectral-spatial masks for the first channel include a first speech mask for the first audio signal, and the spectral-spatial masks for the second channel include a second speech mask for the second audio signal;
determine time-frequency representations by performing a Short Time Fourier Transform (STFT) to the first audio signal and the second audio signal;
calculate a speech Cross Power Spectral Density (CPSD) matrix based on the first speech mask, the second speech mask, and the time-frequency representations and performing beamforming using the speech CPSD matrix.

13. The method of claim 12, wherein estimating spectral-spatial masks for the first channel and the second channel further comprises:
applying a neural network learning model to the concatenated channel features and the cross-channel feature.

14. The method of claim 12, wherein determining channel features further comprises:
determining a first magnitude spectrum of the first audio signal and a second magnitude spectrum of the second audio signal, respectively.

15. The method of claim 14, wherein determining the cross-channel feature further comprises:
determining an inter-channel level difference as a ratio between the first magnitude spectrum and the second magnitude spectrum.

16. The method of claim 12, wherein determining the cross-channel feature further comprises:
determining a first phase spectrum of the first audio signal and a second phase spectrum of the second audio signal, respectively; and
determining an inter-channel phase difference as a difference between the first phase spectrum and the second phase spectrum.

17. The system of claim 12, wherein the spectral-spatial masks for the first channel further include a first noise mask for the first audio signal, and the spectral-spatial masks for the second channel further include a second noise mask for the second audio signal, wherein the first speech mask, the first noise mask, the second speech mask, and the second noise mask are jointly estimated.

18. The system of claim 17, wherein the at least one processor is further configured to:
calculate a noise CPSD matrix based on the first noise mask, the second noise mask, and the time-frequency representations; and perform the beamforming using the speech CPSD matrix and the noise CPSD matrix.

19. The method of claim 12, further comprising:
receiving a third audio signal acquired from the same audio source;
determining an additional channel feature based on the third audio signal;
determining an additional cross-channel feature based on the first audio signal and the third audio signal collectively;
concatenating the channel features and the cross-channel features;
estimating spectral-spatial masks for the first channel, the second channel, and the third channel using the concatenated channel features and the cross-channel feature; and
performing beamforming on the spectral-spatial masks for the first channel, the second channel, and the third channel.

20. A non-transitory computer-readable medium storing instructions that, when executed by one or more processors, cause the one or more processors to perform a method for audio signal processing, the method comprising:
receiving a first audio signal acquired from an audio source through a first channel, and a second audio signal acquired from the same audio source through a second channel;
determining channel features based on the first audio signal and the second audio signal individually;
determining a cross-channel feature based on the first audio signal and the second audio signal collectively;
concatenating the channel features and the cross-channel feature;
estimating spectral-spatial masks for the first channel and the second channel using the concatenated channel features and the cross-channel feature;
wherein the spectral-spatial masks for the first channel include a first speech mask for the first audio signal, and the spectral-spatial masks for the second channel include a second speech mask for the second audio signal;
determine time-frequency representations by performing a Short Time Fourier Transform (STFT) to the first audio signal and the second audio signal;
calculate a speech Cross Power Spectral Density (CPSD) matrix based on the first speech mask, the second speech mask, and the time-frequency representations;
and performing beamforming using the speech CPSD matrix.

* * * * *